(12) United States Patent
Wang et al.

(10) Patent No.: US 12,474,204 B2
(45) Date of Patent: Nov. 18, 2025

(54) METHOD AND APPARATUS FOR MEASURING TOPOLOGICAL CHARGE OF PARTIALLY COHERENT FRACTIONAL VORTEX BEAM

(71) Applicant: SOOCHOW UNIVERSITY, Suzhou (CN)

(72) Inventors: Zhuoyi Wang, Suzhou (CN); Chengliang Zhao, Suzhou (CN); Xingyuan Lu, Suzhou (CN); Qidong Lin, Suzhou (CN); Xiaotan Lu, Suzhou (CN); Xuechun Zhao, Suzhou (CN); Yangjian Cai, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 191 days.

(21) Appl. No.: 18/196,830

(22) Filed: May 12, 2023

(65) Prior Publication Data

US 2023/0366732 A1    Nov. 16, 2023

Related U.S. Application Data

(63) Continuation of application No. PCT/CN2022/110589, filed on Aug. 5, 2022.

(30) Foreign Application Priority Data

May 10, 2022    (CN) .......................... 202210503979.9

(51) Int. Cl.
*G01J 1/42*    (2006.01)
*G01J 1/04*    (2006.01)
(52) U.S. Cl.
CPC ........... *G01J 1/4257* (2013.01); *G01J 1/0411* (2013.01); *G01J 2001/4261* (2013.01)

(58) Field of Classification Search
None
See application file for complete search history.

(56) References Cited

U.S. PATENT DOCUMENTS 5,844,707 A * 12/1998 Minakuchi ............... B41J 2/471
                                                           359/636
2005/0255716 A1 * 11/2005 Tanaka ............... H01L 21/02686
                                                           438/795
2011/0243498 A1   10/2011 Kumar et al.

FOREIGN PATENT DOCUMENTS

CN          103954367 A    *  7/2014
CN          103983367 A    *  8/2014
                      (Continued)

OTHER PUBLICATIONS

Zhang et al.("Review on fractional vortex beam", Dec. 19, 2021, Nanophotonics 2022; 11(2): 241-273.*

*Primary Examiner* — Michelle M Iacoletti
*Assistant Examiner* — Jarreas Underwood
(74) *Attorney, Agent, or Firm* — SZDC Law PC (57) ABSTRACT

A to-be-measured partially coherent fractional vortex beam passes through a scattering object, an error between measurable information and to-be-measured information is minimized by using an optimization algorithm, and a main electric field mode and a weight of a to-be-measured fractional vortex beam are reconstructed by using a multimode stacked diffraction algorithm. A cross-spectral density function of the partially coherent fractional vortex beam is calculated, a cross-spectral density of a partially coherent fractional vortex optical field is reconstructed, and complete information including light intensity, a light intensity association, an electric field association, a phase, and the like of the partially coherent fractional vortex optical field is obtained. After the complete information of the partially coherent fractional vortex optical field is obtained, reverse (Continued)

transmission calculation is performed to obtain a source field vortex phase distribution, thereby implementing accurate topological charge measurement of the fractional vortex beam under low coherence conditions.

8 Claims, 3 Drawing Sheets

(56) References Cited

FOREIGN PATENT DOCUMENTS

| CN | 104323790 A | * | 2/2015 | |
|---|---|---|---|---|
| CN | 105466577 A | | 4/2016 | |
| CN | 107764417 A | | 3/2018 | |
| CN | 113155296 A | * | 7/2021 | ............. G01J 11/00 |
| CN | 111412983 A | * | 7/2022 | ............ G01J 1/4257 |

* cited by examiner

METHOD AND APPARATUS FOR MEASURING TOPOLOGICAL CHARGE OF PARTIALLY COHERENT FRACTIONAL VORTEX BEAM

This application is a Continuation Application of PCT/CN2022/110589, filed on Aug. 5, 2022, which claims priority to Chinese Patent Application No. 202210503979.9, filed on May 10, 2022, which is incorporated by reference for all purposes as if fully set forth herein.

FIELD OF THE INVENTION

The present invention relates to the field of optical measurement technologies, and in particular to a method and an apparatus for measuring a topological charge of a partially coherent fractional vortex beam and a computer storage medium.

DESCRIPTION OF THE RELATED ART

In the prior art, a vortex beam specifically refers to a beam carrying a helical phase with a wavefront helically rotating in a direction of an optical axis, which may be quantitatively described by a phase factor $\exp(il\theta)$, where $l$ and $\theta$ denote a topological charge and an azimuthal angle, respectively. The manipulation of an optical field vortex phase has gradually extended into a new research direction, namely singularity optics. In 1992, Allen et al. pointed out that each photon of a vortex beam carries an orbital angular momentum of $l\hbar$ ($\hbar$ is a reduced Planck constant) and revealed a new connection between macroscopic optics and quantum effects. Apparently, the orbital angular momentum is a characteristic value and has transport robustness, which determines the value of the orbital angular momentum carried by each photon. Compared with conventional plane and spherical waves, vortex beams are characterized by distinct helical wavefronts and annular intensity structures due to central phase singularities. The unique physical properties of vortex beams make the vortex beams play an important role in various fields such as optical communication, particle manipulation, optical imaging, quantum information, astronomy, optical detection, medical diagnosis, and many other applications in different fields. To enhance the practical applications of vortex beams, an increasing number of new methods for generating a vortex beam and detecting a topological charge of the vortex beam have been proposed in the past five years. In addition, further research on vortex beam modulation is expected to facilitate the birth of new physical phenomena and scientific applications and is of great scientific significance.

In most vortex-related studies, the value of a topological charge is restricted to an integer only, that is, a helical wavefront of topological charge has a step of $2l\pi$, with $l$ being an integer. In fact, the value of the topological charge may be a non-integer (a phase step is not an integer multiple of $2\pi$), and vortex beams with non-integer topological charges are called fractional vortex beams [Opt. Commun. 1994, 112, 321-327, Opt. Commun. 1995, 119, 604-612, Nanophotonics, 11 (2): 241-273 (2022)]. Unlike integer-order vortex beams, fractional vortex beams show a discontinuity at a phase jump, and the annular intensity structure is disrupted with a radial dark opening (or a low-intensity gap). In 2004, Berry studied theoretically the vortex structure of beams with fractional vortex phases in detail and mentioned that fractional vortex beams may be expressed as a superposition of a series of integer-order vortices [J. Opt. A-Pure Appl. Op. 2004, 6, 259-268.]. In other words, a vortex beam with a fractional topological charge may be decomposed into a Fourier series of integer-order vortex beams with different intensity weights. When the topological charge is a half integer, an infinitely long chain of vortices with alternating intensity appears at a discontinuity at a phase step and vanishes when the topological charge is greater or smaller than a half integer. It should be noted that the orbital angular momentum of each photon may carry an integer value or a non-integer value in units of $\hbar$. The remarkable feature of the fractional vortex beam is that it cannot propagate stably in free space. However, in other words, the fractional vortex beam exhibits a rich evolutionary process that induces complex amplitude and phase structures and increases the modulation degrees of freedom. More specifically, based on intrinsic properties of the fractional vortex beam, fractional vortex beams may be classified into fractional Gaussian vortex beams, fractional Bessel-Gaussian beams, fractional Laguerre-Gaussian beams, perfect fractional vortex beams, elliptic fractional vortex beams, and partially coherent fractional vortex beams, among others.

In recent years, fractional vortex beams have attracted great attention in the field of light manipulation due to unusual properties of the fractional vortex beams. First, the interaction between light and matter is the most intuitive mechanism to demonstrate the potential applications of fractional vortex beams. Compared with integer-order vortex beams that only implement optical ring rotation, fractional vortex beams have a unique intensity distribution that enables precise control of cell sorting or cell orientation. It is always a great challenge to significantly increase the information capacity of optical communication systems. The patterns of orbital angular momentums are orthogonal to each other, which may be considered as a new degree of freedom to solve this problem. Therefore, in optical communication systems, fractional vortex beams with continuous integers and non-integer orbital angular momentum states may overcome an aperture size limitation and extend communication capacity. Another practical application of fractional vortex beams is optical imaging. It has been proved that beams carrying orbital angular momentum can implement image edge enhancement. Compared with regular vortex beams which only implement isotropic edge enhancement, fractional vortex beams can implement anisotropic edge enhancement. In addition, fractional vortex beams can effectively resist noise effects and implement high-resolution imaging in radar imaging systems.

In view of the wide range of applications of vortex beams, various techniques have been proposed to measure topological charges of vortex beams. For example, a quantity and a direction of forks in an interference pattern of a vortex beam and a plane wave may correspond to the magnitude and sign of a topological charge, respectively. The vortex beam may be converted into a non-hollow spot by a phase grating of an opposite topological charge, which also helps to identify the value of the topological charge. In addition, wavefront measurement is the most intuitive technique to obtain the value of the topological charge. That is, the phase integral around a singularity divided by $2\pi$ may correspond to the value of the topological charge. However, fractional vortex beams destroy the orthogonality of an orbital angular momentum, and the measurement of the fractional vortex beams should be modeled as a complex case of a mixed integer-order orbital angular momentum. Therefore, most conventional methods effective for integer-order vortex beams become ineffective in coping with the measurement of fractional vortex topological charges.

The research of using a coherent stacked diffraction imaging algorithm to solve the light field measurement has been developed in recent years, thanks to the continuous improvement and innovation of coherent diffraction imaging algorithms. When the coherence of a light source is degraded, if a method for coherent diffraction with a fully coherent beam is still used, images obtained are blurred or has large errors. In addition to possible degradation of coherence of the light source, the instability of an optical system including a sample, a camera, and a transmission medium is also equivalent to the degradation of coherence. Similar to the degradation of spatial coherence, the degradation of temporal coherence also poses a great problem for reconstruction. Based on this, Arjun et al. proposed a stacked imaging algorithm with a mixed-state model. Arjun et al. introduced the concepts of real modes and ghost modes based on the stacked diffraction imaging algorithm [Phy. Rev. Lett. 2020, 125, 086101] and proposed a solution for a broad-spectrum light source. The algorithm allows the simultaneous reconstruction of spectra with multiple wavelengths, probes, and images corresponding to the spectra.

Currently available measurement schemes for fractional vortex beams are mainly based on the following measurement methods.

1. Based on a modified interferometric method [Opt. Commun. 2015, 334, 235-239, Opt. Commun. 2012, 285, 383-388], a fractional vortex beam is rotated by 180° to interfere with the fractional vortex beam itself, and a topological charge is qualitatively observed based on an interferometric result.
2. Mode conversion method [Opt Commun 1999; 159: 13-18]: Laguerre fractional vortices are converted into a Hermitian mode through a mutually perpendicular column mirrors, and then a topological charge of a fractional vortex beam is qualitatively analyzed.
3. Dynamic double-slit method [Photonics Res. 2016, 4, 187-190]: After a fractional vortex beam is interfered through a variable double-slit, and then changes in light intensity are observed to determine a topological charge of the fractional vortex beam.
4. Machine learning-based measurement method [Phys. Rev. Lett. 2019, 123, 183902]: Diffraction or interference patterns are used to identify fractional topological charges by comparing intensity shapes with theoretical values. In combination with machine learning, more accurate identification can be obtained based on intensity feature analysis.

For the measurement of a fractional topological charge, except the deep learning recognition method, the above methods have low accuracy. The deep learning recognition method relies on the training of a large amount of data and performs identification based on characteristics such as light intensity, and the training of fixed systems is not universal. On the other hand, interference-based measurement schemes also fail when coherence degrades. The spectrum distribution of an orbital angular momentum of a vortex beam is affected after coherence degrades, and a quantitative relationship between an orbital angular momentum spectrum and a topological charge has not been verified. A fractional topological charge of a partially coherent fractional vortex beam cannot be solved and characterized quantitatively at present.

SUMMARY OF THE INVENTION

For this, a technical problem to be resolved by the present invention is to overcome problems of low accuracy and failures in quantitative solving and characterization after coherence degrades in the prior art.

To resolve the foregoing technical problems, the present invention provides a method for measuring a topological charge of a partially coherent fractional vortex beam, including:

irradiating a to-be-measured fractional vortex beam to a scattering sample, performing a horizontal and vertical movement overlap scan, and acquiring diffraction light intensity by using a detector placed in a diffraction area;

calculating a to-be-measured electric field and performing iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam;

reconstructing a cross-spectral density function of the to-be-measured fractional vortex beam according to the target to-be-measured electric field, and obtaining optical field information of the to-be-measured fractional vortex beam; and performing reverse transmission calculation according to the cross-spectral density function and the optical field information of the to-be-measured fractional vortex beam to obtain a source field vortex phase distribution diagram, and observing a magnitude and a sign of a topological charge of the to-be-measured fractional vortex beam according to the source field vortex phase distribution diagram.

Preferably, the diffraction area is a Fresnel diffraction area or a Fraunhofer diffraction area.

Preferably, an overlap rate of the overlap scan ranges from 60% to 70%.

Preferably, before the calculating a to-be-measured electric field and performing iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam, the method includes:

decomposing a cross-spectral density $W(r_1,r_2)$ of the to-be-measured fractional vortex beam into a plurality of electric fields $$\sum_{i}^{N_R} O_{(r1)}^{*i} O_{(r2)}^{i} (i = 1, 2, 3, \ldots, \text{and } n)$$

by using a random modulus decomposition method, where $O_{(r1)}{}^i$ and $O_{(r2)}{}^i$ are $i^{th}$ electric fields after the to-be-measured fractional vortex beam is decomposed, $N_R$ is a positive integer selected according to a different degree of coherence, and r1 and r2 are spatial coordinates.

Preferably, the calculating a to-be-measured electric field and performing iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam includes:

step 1: assuming that the cross-spectral density of the to-be-measured fractional vortex beam irradiated to the scattering sample is $$W(r_1, r_2) = \sum_i^{N_R} O^{*i}_{(r1)} O^i_{(r2)},$$

and assuming that a transmittance function of a $j^{th}$ time of irradiation to the scattering sample is $P(r-R_j)$, where r represents a coordinate, $R_j$ represents a relative displacement between the to-be-measured fractional vortex beam and the scattering sample, and j represents the $j^{th}$ time of irradiation to a sample area;

step 2: calculating that each outgoing field after the to-be-measured fractional vortex beam passes through the scattering sample is $\varphi_j^i(r) = O_{(r)}^i * P(r-R_j)$;

step 3: updating a diffraction field by using the diffraction light intensity acquired by the detector, and updating the outgoing field to $\varphi'_j{}^i(r)$ according to the diffraction field;

step 4: updating each to-be-measured electric field Ot:

$$O_j'^i(r) = O_j^i(r) + \alpha \frac{P_j^*(r-R_j)}{|P_j^*(r-R_j)|^2_{max}} (\varphi_j'^i(r) - \varphi_j^i(r)), \text{ and}$$

$$P_j'(r-R_j) = P_j(r-R_j) + \beta \frac{O_j^{*i}(r)}{|o_j^{*i}(r)|^2_{max}} (\varphi_j'^i(r) - \varphi_j^i(r)),$$

where $\alpha$ and $\beta$ are constants, $\varphi'_j{}^i(r)$ represents an updated $i^{th}$ outgoing light electric field corresponding to a $j^{th}$ scan position, $\varphi_j^i(r)$ is an $i^{th}$ outgoing optical field corresponding to the $j^{th}$ scan position, O' (r) is an updated $i^{th}$ incident light electric field irradiated to the scattering sample corresponding to the $j^{th}$ scan position, $O_j^i(r)$ is an $i^{th}$ incident light electric field irradiated to the scattering sample corresponding to the $j^{th}$ scan position, $P'_j(r-R_j)$ is an updated transmittance function of the $j^{th}$ time of irradiation to the scattering sample, and * represents taking conjugate; and step 5: determining, by using a gradient descent algorithm, whether the error between the diffraction light intensity acquired by the detector and the currently calculated diffraction light intensity reaches a preset minimization threshold, and if the error reaches the minimization threshold, obtaining the target to-be-measured electric field, or otherwise repeating steps 2 to 5 until the error reaches the minimization threshold.

Preferably, the reconstructing a cross-spectral density function of the to-be-measured fractional vortex beam according to the target to-be-measured electric field includes:

making the cross-spectral density function $$W(r_1, r_2) = \sum_i^{N_R} \alpha_i O^{*i}_{(r1)} O^i_{(r2)},$$

where $\alpha_i = 1/N_R$ is a spectral weight; and for a partially coherent beam, introducing a vortex phase, where the cross-spectral density may be represented as $W_0(r_1, r_2) = W(r_1, r_2) \exp(-il\theta_1) \exp(il\theta_2)$, where $\theta$ is an angular coordinate, l is the topological charge, when l is an integer, the cross-spectral density is represented as a partially coherent integer-order vortex phase, and when l is a fraction, the cross-spectral density is represented as a partially coherent fractional vortex phase.

Preferably, the obtaining optical field information of the to-be-measured fractional vortex beam includes:
letting r1=r2, and calculating light intensity I; and
letting r2=0, and calculating a degree of coherence μ.

Preferably, the performing reverse transmission calculation according to the cross-spectral density function and the optical field information of the to-be-measured fractional vortex beam to obtain a source field vortex phase distribution diagram, and observing a magnitude and a sign of a topological charge of the to-be-measured fractional vortex beam according to the source field vortex phase distribution diagram includes:

performing W/|W| on the cross-spectral density function W to calculate a cross-spectral density phase distribution function:

obtaining the source field vortex phase distribution diagram according to the cross-spectral density phase distribution function; and observing a phase jump of a source plane or performing loop integration on a phase according to the source field vortex phase distribution diagram to obtain the topological charge of the fractional vortex beam.

The present invention further provides an apparatus for measuring a topological charge of a partially coherent fractional vortex beam, including:

a light source, configured to emit a partially coherent beam;

a spatial light modulator, configured to generate a partially coherent fractional vortex beam, that is, a to-be-measured fractional vortex beam;

a displacement platform, configured to: move a scattering sample, and perform a horizontal and vertical movement overlap scan;

a detector, placed in diffraction area, and configured to acquire diffraction light intensity; and a computer, configured to: calculate a to-be-measured electric field and perform iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam; reconstruct a cross-spectral density function of the to-be-measured fractional vortex beam according to the target to-be-measured electric field, and obtain optical field information of the to-be-measured fractional vortex beam; and perform reverse transmission calculation according to the cross-spectral density function and the optical field information of the to-be-measured fractional vortex beam to obtain a source field vortex phase distribution diagram, and observe a magnitude and a sign of a topological charge of the to-be-measured fractional vortex beam according to the source field vortex phase distribution diagram.

The present invention further provides a computer-readable storage medium, the computer-readable storage medium storing a computer program, the computer program being executed by a processor to implement the steps of the foregoing method for measuring a topological charge of a partially coherent fractional vortex beam.

Compared with the prior art, the foregoing technical solution of the present invention has the following advantages:

In the method for measuring the magnitude and sign of a topological charge of a partially coherent fractional vortex beam in the present invention, a to-be-measured fractional vortex beam is irradiated to a sample, and then diffraction light intensity is measured to determine a main mode of the to-be-measured fractional vortex beam through multi-mode stacked diffraction. Reverse transmission is performed according to these modes to a source plane, the topological charge of the fractional vortex beam is determined by observing a phase jump. The method has advantages such as high optical efficiency, high accuracy, and no additional optical devices. In the present invention, a multi-mode stacked imaging technique is applied to the measurement of a partially coherent fractional vortex beam. The technique has advantages of high accuracy and a large field of view in reconstructing light source mode information, thereby ensuring that reverse transmission calculation can be performed on a measured light field, and then source field phase information is obtained, so that the topological charge of the partially coherent fractional vortex beam can be accurately measured. This technique also solves the key scientific problem that it is difficult to separate electric field modes in space, and partially coherent optical mode multiplexing becomes as a new usable dimension of space division multiplexing, which greatly increases the capacity of optical communication and has important applications in optical communication, optical encryption and decryption, and the like.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

The core of the present invention is to provide to a method and an apparatus for measuring a topological charge of a partially coherent fractional vortex beam and a computer storage medium, so that precision is high, and a fractional topological charge of a partially coherent fractional vortex beam is quantitatively solved and characterized.

To enable a person skilled in the art to better understand the solutions of the present invention, the present invention is further described below in detail with reference to the accompanying drawings and specific implementations. Apparently, the described embodiments are merely some rather than all of the embodiments of the present invention. All other embodiments obtained by persons of ordinary skill in the art based on the embodiments of the present invention without creative efforts fall within the protection scope of the present invention.

Figure 1:
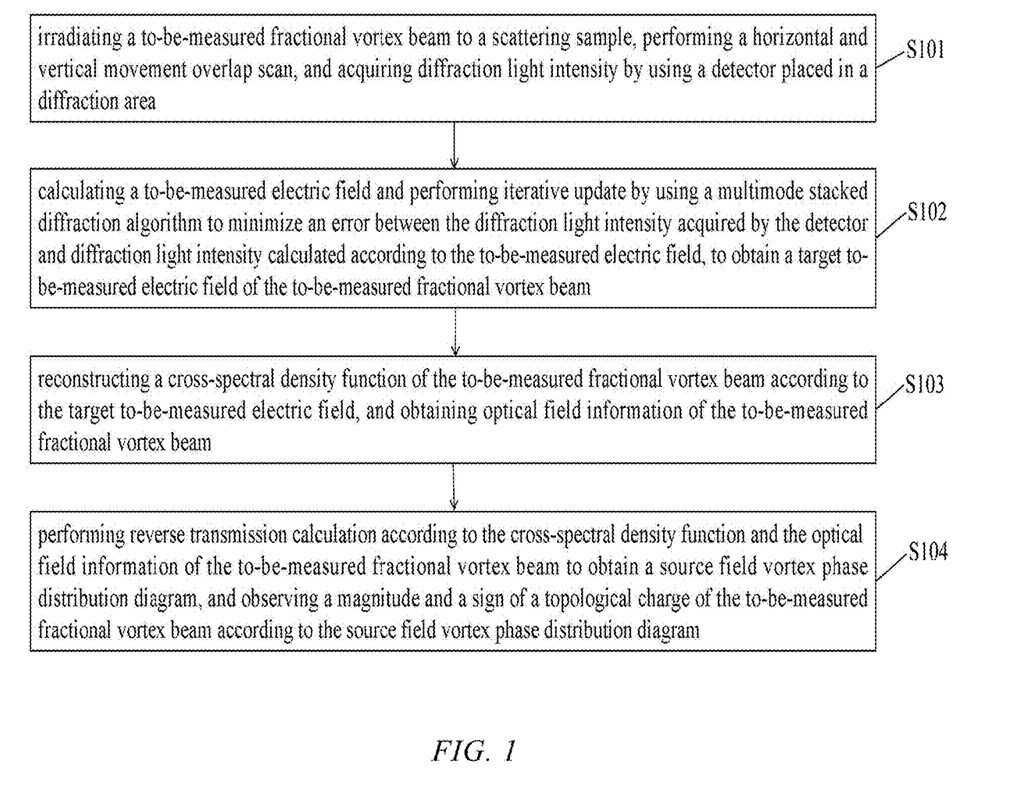
FIG. 1 is a flowchart of implementing measurement of a topological charge of a partially coherent fractional vortex beam according to the present invention.

Refer to FIG. 1. FIG. 1 is a flowchart of implementing measurement of a topological charge of a partially coherent fractional vortex beam according to the present invention. Specific operation steps are as follows:

S101: Irradiate a to-be-measured fractional vortex beam to a scattering sample, perform a horizontal and vertical movement overlap scan, and acquire diffraction light intensity by using a detector placed in a diffraction area.

Figure 2:
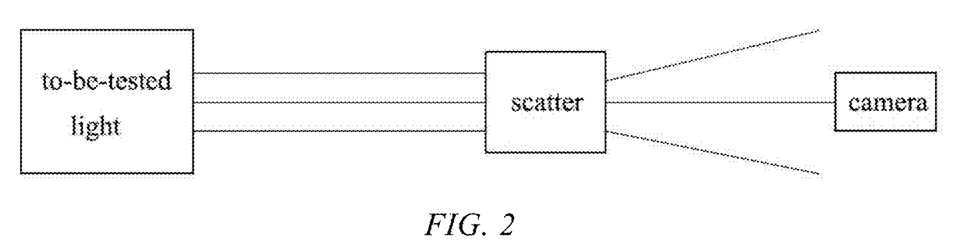
FIG. 2 is a schematic diagram of acquiring diffraction light intensity.
Figure 3:
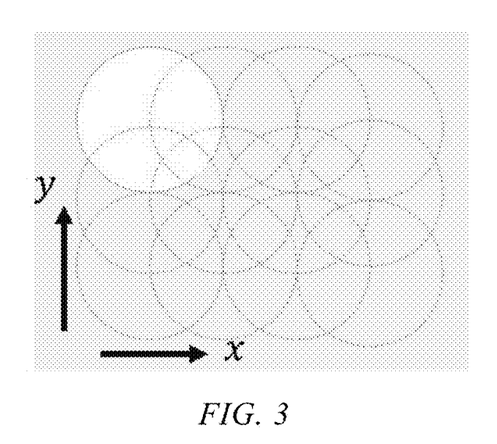
FIG. 3 is a schematic diagram of an overlap scan.

As shown in FIG. 2, in an optical imaging method based on a coherent diffraction imaging concept, a to-be-measured fractional vortex beam is irradiated to a strong scattering sample. The to-be-measured fractional vortex beam and the sample move along x and y to perform an overlap scan (as shown in FIG. 3). An overlap rate of the overlap scan ranges from 60% to 70%. A CCD is placed at a Fourier plane or a far field of the sample to acquire diffraction light intensity (the diffraction area is a Fresnel diffraction area or a Fraunhofer diffraction area), to acquire a series of light intensity. Through a Fourier transform constraint of temporal space and spectrum space, relative phases between adjacent areas may be calculated from information redundancy generated from overlapping of the adjacent areas, to reconstruct an image, thereby implementing high-resolution imaging of a to-be-tested light source and a to-be-measured object. Because no lens is used, the theoretical resolution of the method may be higher than that of a conventional optical system. This solution solves a convergence problem in a reconstruction algorithm and implements both a large field of view and high resolution.

S102: Calculate a to-be-measured electric field and perform iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam.

S103: Reconstruct a cross-spectral density function of the to-be-measured fractional vortex beam according to the target to-be-measured electric field, and obtain optical field information of the to-be-measured fractional vortex beam.

S104: Perform reverse transmission calculation according to the cross-spectral density function and the optical field information of the to-be-measured fractional vortex beam to obtain a source field vortex phase distribution diagram, and observe a magnitude and a sign of a topological charge of the to-be-measured fractional vortex beam according to the source field vortex phase distribution diagram.

In a case that an electric field is reconstructed, reverse transmission calculation and reverse focusing calculation may be calculated to restore a vortex phase at a source plane, thereby implementing calculation of a topological charge. The calculation of a topological charge may be given based on a multiple relationship between a phase jump and $2\pi$. This relationship satisfies the original definition of a fractional vortex beam. Based on the high resolution characteristic of the stacked coherent diffraction imaging algorithm, high-resolution and high-precision measurement of a fractional topological charge in a case of a weak light source signal and a turbulence in a transmission medium can be implemented.

Based on the foregoing embodiments, step S102 is further described in detail. Details are as follows:

A partially coherent optical field is an electric field with random fluctuations, which may be understood as a statistical average $<E^*(r_1)E(r_2)>$ of an instantaneous electric field, is extended by using intrinsic modes $\phi_{mn}$ that are orthogonal to each other, and may be represented as:

$$\sum_{m=0}^{N_c}\sum_{n=0}^{N_c}\lambda_{mn}\phi_{mn}^*(r_1)\phi_{mn}(r_2),$$

where $\lambda_{mn}$ represents a weight of a mode. For classic Gaussian Schell model (GSM) partially coherent light, a cross-spectral density function may be decomposed into non-coherence superposition of a Hermitian-Gaussian (HG) mode, that is:

$$\phi_{mn}(r) = \left(\frac{2c}{\pi}\right)^{1/2}\frac{1}{\sqrt{2^{m+n}m!n!}}H_m(x\sqrt{2c})H_n(y\sqrt{2c})\cdot\exp[-c(x^2+y^2)],$$

where $H_m$ and $H_n$ respectively represent an $m^{th}$-order Hermitian polynomial and an $n^{th}$-order Hermitian polynomial, and Ne represents a quantity of modes. This mode decomposition and representation method is called coherent mode decomposition. Another decomposition manner is a random mode decomposition method. In this method, a partially coherent beam is represented by a non-coherence superposition of spatially random complex fields:

$$\sum_{n=1}^{N_R}\alpha_n E_n^*(r_1)E_n(r_2),$$

where $\alpha_n = 1/N_R$ represents a mode weight, and $E_n(r)$ represents one of the random models.

The foregoing coherent mode decomposition and random mode decomposition principles have been widely applied to experimental generation of partially coherent light, and similarly may be applied to measurement of a partially coherent optical field.

A cross-spectral density $W(r_1,r_2)$ of the to-be-measured beam is decomposed into a plurality of electric fields $$\sum_{i}^{N_R} O_{(r1)}^{*i} O_{(r2)}^{i} (i = 1, 2, 3, \ldots, \text{and } n)$$

by using a decomposition method, where $O_{(r1)}^{i}$ and $O_{(r2)}^{i}$ are $i^{th}$ electric fields after the to-be-measured beam is decomposed, $N_R$ is a positive integer selected according to a different degree of coherence ($N_R$ is theoretically infinitely great, and takes a finite value in an actual process. $N_R$ is greater than 2000 when coherence is low, and an error can be neglected. When a degree of coherence/beam waist width ratio is between 1 and 0.1, high accuracy can be ensured by making $N_R$ between 4×4 and 10×10), and $r_1$ and $r_2$ are spatial coordinates.

Step a: Assume that the cross-spectral density of the to-be-measured beam irradiated to the scattering sample is $$W(r_1, r_2) = \sum_{i}^{N_R} O_{(r1)}^{*i} O_{(r2)}^{i},$$

and assume that a transmittance function of a $j^{th}$ time of irradiation to the scattering sample is $P(r-R_j)$, where r represents a coordinate, $R_j$ represents a relative displacement between the to-be-measured beam and the scattering sample, and j represents the $j^{th}$ time of irradiation to a sample area.

Step b: Calculate that each outgoing field after the to-be-measured beam passes through the scattering sample is $\varphi_j^i(r) = O_{(r)}^i * P(r-R_j)$.

Step c: Update a diffraction field and an outgoing field by using measured light intensity. The diffraction field is updated to $$\Psi_j'^i(k) = \frac{I_j(k)}{\sqrt{\sum_{m=1}^{M}(|\Psi_j(k)|^2)}}\Psi_j^i(k),$$

where $\Psi_j^i(k)=\text{FFT}\{\varphi_{(r)}^i\}$, corresponding to a diffraction field of an $i^{th}$ mode, $I_j(k)$ is diffraction light intensity of the $j^{th}$ time of irradiation acquired by the detector, and is light intensity contributed by all electric field modes, $$\sqrt{\sum_{m=1}^{M}(|\Psi_j(k)|^2)}$$

is an amplitude of the outgoing field obtained through iterative calculation, and M is a total quantity of modes. An outgoing wave $\varphi'_j^i(r) = \text{IFFT}(\Psi'_j^i(k))$ of the $i^{th}$ mode is updated by using inverse Fourier transform. FFT represents Fourier transform, and IFFT represents inverse Fourier transform.

Step d: Update each to-be-measured electric field $O_{(r)}^i$:

$$O_j'^i(r) = O_j^i(r) + \alpha\frac{P_j^*(r-R_j)}{|P_j(r-R_j)|^2_{max}}(\varphi_j'^i(r) - \varphi_j^i(r)), \text{ and}$$

$$P_j'(r-R_j) = P_j(r-R_j) + \beta\frac{O_j^{*i}(r)}{|o_j^{*i}(r)|^2_{max}}(\varphi_j'^i(r) - \varphi_j^i(r)),$$

where $\alpha$ and $\beta$ are constants, $\varphi'_j^i(r)$ represents an updated $i^{th}$ outgoing light electric field corresponding to a $j^{th}$ scan position, q (r) is an $i^{th}$ outgoing optical field corresponding to the $j^{th}$ scan position, O' (r) is an updated $i^{th}$ incident light electric field irradiated to the scattering sample corresponding to the $j^{th}$ scan position, $O_j^i(r)$ is an $i^{th}$ incident light electric field irradiated to the scattering sample corresponding to the $j^{th}$ scan position, $P'_j(r-R_j)$ is an updated transmittance function of the $j^{th}$ time of irradiation to the scattering sample, and * represents taking conjugate.

Step e: Determine, by using a gradient descent algorithm, whether the error between the diffraction light intensity acquired by the detector and the currently calculated diffraction light intensity reaches a preset minimization threshold, and if the error reaches the minimization threshold, obtain the target to-be-measured electric field, or otherwise repeat steps b to e until the error reaches the minimization threshold. If the beam is fully coherent light, a difference from partially coherent light only lies in that a plurality of electric fields need to be measured for partially coherent light. Therefore, in the present invention, a fully coherent fractional vortex beam can also be measured.

In the present invention, an iterative algorithm in mixed mode stacked coherent diffraction imaging is used to implement the reconstruction of an electric field mode: A light source irradiates a sample, a diffraction pattern in a Fresnel diffraction area is recorded, and the diffraction pattern and an object plane satisfy a Fourier transform relationship. A camera in a diffraction plane can only record an amplitude of an optical field, and phase information is missing. To solve a phase, information of a to-be-measured plane is reconstructed. In the iterative algorithm of coherent diffraction imaging, an algorithm such as a gradient descent is used minimize an error between photographing light intensity and calculated light intensity. To resolve iterative convergence and unique solution problems, redundant overlap scans are used in stacked coherent diffraction imaging technologies, and diffraction information constraining each other greatly improves the convergence speed and accuracy of iteration. Mixed mode synchronous iteration is used in a stacked coherent diffraction imaging iteration algorithm. The "mixed mode" refers to an electric field mode of partially coherent light. The present invention mainly studies reconstruction results of a light source, and extracts information carried in the light source.

Based on the foregoing embodiments, steps S103 and S104 are further described in detail in this embodiment. Details are as follows:

making cross-spectral density function $$W(r_1, r_2) = \langle E^*(r_1)E(r_2)\rangle = \sum_i^{N_R} \alpha_i O_{(r1)}^{*i} O_{(r2)}^i,$$

where $\alpha_i = 1/N_R$ is a spectral weight; and for a partially coherent beam, introducing a vortex phase, where the cross-spectral density may be represented as $W_0(r_1,r_2)=W(r_1,r_2)\exp(-il\theta_1)\exp(il\theta_2)$, where $\theta$ is an angular coordinate, l is the topological charge, when l is an integer, the cross-spectral density is represented as a partially coherent integer-order vortex phase, and when l is a fraction, the cross-spectral density is represented as a partially coherent fractional vortex phase;

letting r1=r2, and calculating light intensity I; and letting r2=0, and calculating a degree of coherence μ;

performing W/|W| on the cross-spectral density function W to calculate a cross-spectral density phase distribution function:

obtaining the source field vortex phase distribution diagram according to the cross-spectral density phase distribution function; and observing a phase jump of a source plane or performing loop integration on a phase through reverse transmission or reverse focusing of an optical field to a source plane to obtain the topological charge of the fractional vortex beam.

If a partially coherent vortex beam is focused, according to the principle of Fourier transform, a relationship between a cross-spectral density $W_0(r_1,r_2)$ of a source field and a cross-spectral density $W_f(\rho_1,\rho_0)$ of a focal field may be derived, and may be briefly described as:

$$F^{-1}\{W_f(\rho_1,\rho_0)\} \propto \times W_0(r_1,r_2).$$

Similarly, a cross-spectral density quantitative association between an acceptance plane at a random transmission distance and the source plane may also be derived.

The partially coherent beam may be considered as non-coherence superposition of a fully coherent beam. A to-be-measured partially coherent beam passes through a scattering object. An error between measurable information and to-be-measured information is minimized by using a gradient descent algorithm. A main electric field mode and a weight of a to-be-measured fractional vortex beam are reconstructed. Based on a mathematical relationship between an electric field mode and a cross-spectral density, a cross-spectral density function of the partially coherent beam is calculated, a cross-spectral density of partially coherent optical field is reconstructed, and complete information including light intensity, a light intensity association, an electric field association, a phase, and the like of the partially coherent optical field is obtained. After the complete information of the partially coherent optical field is obtained, reverse transmission calculation is performed to obtain a source field vortex phase distribution, thereby implementing accurate topological charge measurement of the fractional vortex beam under low coherence conditions. Therefore, the present invention may be used for the measurement of a low coherent fractional vortex optical field. Accurate measurement and reverse transmission calculation in a partially coherent light electric field mode are implemented by using the solution of reconstructing source field information with a diffraction pattern and in combination with the iterative algorithm in mixed mode stacked coherent diffraction imaging. This technique also solves the key scientific problem that it is difficult to separate electric field modes in space, and partially coherent optical mode multiplexing becomes as a new usable dimension of space division multiplexing, which greatly increases the capacity of optical communication and has important applications in optical communication, optical encryption and decryption, and the like.

A specific embodiment of the present invention further provides a computer-readable storage medium, the computer-readable storage medium storing a computer program, the computer program being executed by a processor to implement the foregoing steps S102 to S104.

Embodiments of the present invention further provide an apparatus for measuring a topological charge of a partially coherent fractional vortex beam, including:

a light source, configured to emit a partially coherent beam;

a spatial light modulator, configured to generate a partially coherent fractional vortex beam, that is, a to-be-measured fractional vortex beam;

a displacement platform, configured to: move a scattering sample, and perform a horizontal and vertical movement overlap scan;

a detector, placed in diffraction area, and configured to acquire diffraction light intensity; and a computer, configured to: calculate a to-be-measured electric field and perform iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam; reconstruct a cross-spectral density function of the to-be-measured fractional vortex beam according to the target to-be-measured electric field, and obtain optical field information of the to-be-measured fractional vortex beam; and perform reverse transmission calculation according to the cross-spectral density function and the optical field information of the to-be-measured fractional vortex beam to obtain a source field vortex phase distribution diagram, and observe a magnitude and a sign of a topological charge of the to-be-measured fractional vortex beam according to the source field vortex phase distribution diagram.

Figure 4:
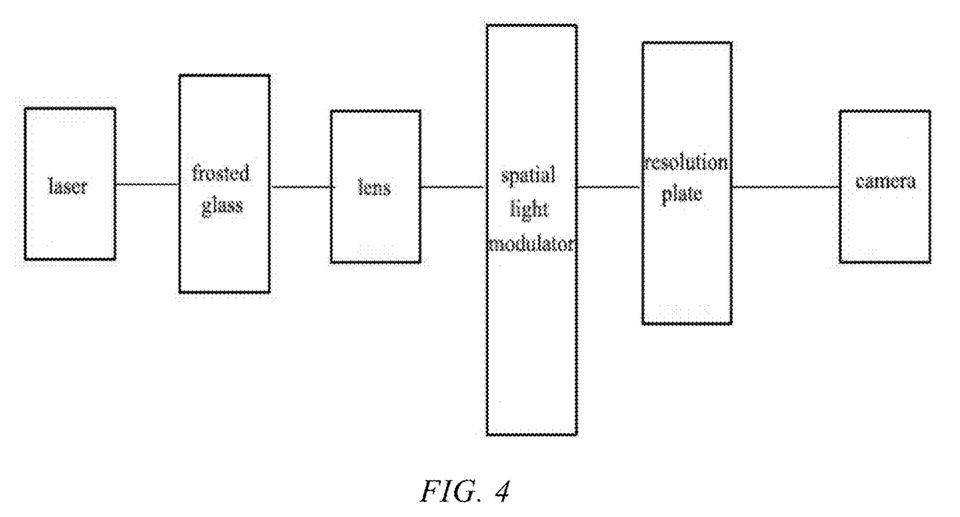
FIG. 4 is an experimental light path diagram of generate and measuring a partially coherent fractional vortex beam.

As shown in FIG. 4, specific experimental steps of generating and measuring a partially coherent fractional vortex beam in this embodiment are as follows:

A semiconductor solid-state laser (with a wavelength of 532.8 nm) emits laser light to enter a rotating frosted glass sheet. A beam is collimated by a lens after diffusion by the rotating frosted glass sheet (with a rotation frequency of 20 HZ). The degree of coherence of partially coherent light can be changed by changing the size of a spot irradiated on frosted glass. After the partially coherent beam passes through a spatial light modulator, a partially coherent fractional vortex beam is generated. The degree of coherence of the generated partially coherent light field is large when the spot irradiated on the frosted glass is very small. In an embodiment, a beam on a rear surface of the spatial light modulator (with a degree of coherence of 1 mm and a beam waist of 1 mm) is a measurement object.

After being transmitted by a distance, a to-be-measured fractional vortex beam is focused and irradiated on a resolution board. The resolution board is placed on a displacement platform, and a displacement distance may be controlled by using MATLAB software. In this example, the displacement platform is displaced by 10 steps in both an x direction and a y direction, with a step size of 20 μm. The size of a spot on the resolution board is approximately 150 um. A camera acquires diffraction light intensity at 13 cm away from the resolution board. After the acquired diffraction light intensity is introduced into multi-mode stacked diffraction imaging, the main modes of the partially coherent fractional vortex beam may be obtained. The beam is retransmitted to a plane of the spatial light modulator in these modes. A topological charge may be obtained by examining phase discontinuity at this time.

Figure 5:
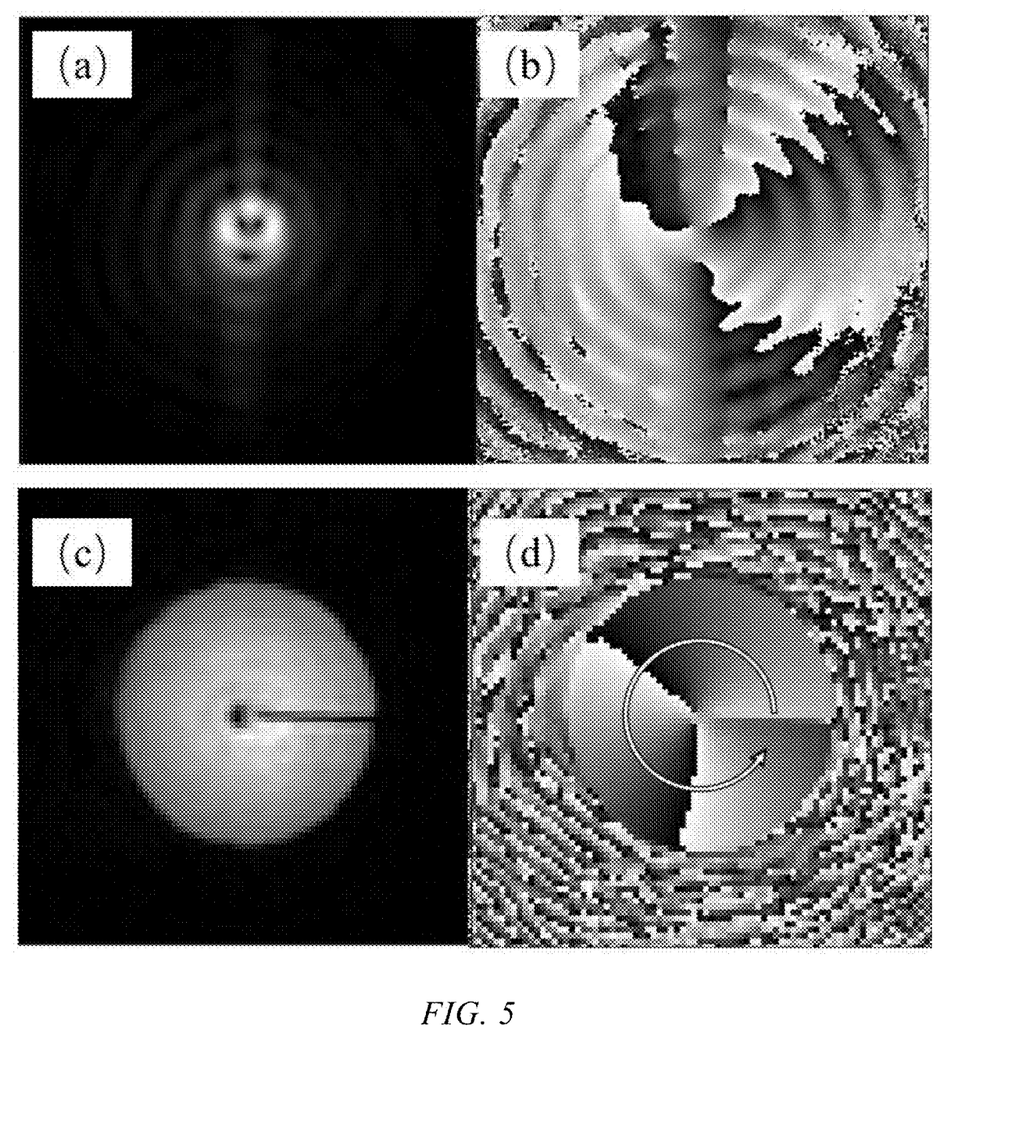
FIG. 5 is a schematic diagram of experimental results of a cross-spectral density distribution of an (a-b) focal field of a partially coherent fractional vortex beam when TC=2.5 and a cross-spectral density distribution of a source field obtained through (c-d) retransmission.

Experimental results are shown in FIG. 5. After one circle, a total number of phase discontinuity is $\varphi=5.005°$ C. to calculate TC=$\varphi/2$=2.5025, and the accuracy is 99.9%.

Instruments in this embodiment are specifically:

A pure phase spatial light modulator is a reflective pure phase spatial light modulator: HOLOEYE GAEA, which has a size of 3840*2160 pixels and a pixel size of 3.74 μm. The pure phase spatial light modulator is configured to set a measurement range. That is, a vortex phase is loaded on the spatial light modulator, so that a partially coherent beam can be converted into a fractional partially coherent beam.

The displacement platform used in the present invention is a Newport Gothic Bearing XYZ translation table (with a step size less than 30 nm), and displacement precision is within 100 nm.

A sample used in the present invention is a resolution board (USAF), produced by the American Thorlabs Company.

In the present invention, the light detector is a CCD or a CMOS. In this embodiment, the used CCD is an EMCCD (electron-multiplying camera) professional camera. Specific parameters include a size of is 1024*1024 pixels and a pixel size of 13 μm. The CCD is driven by the MATLAB software. The foregoing software is used to observe and store image information received by the CCD. After the CCD is connected to a computer, the MATLAB software is used to record and store the image information received by the CCD.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. An apparatus for measuring a topological charge of a partially coherent fractional vortex beam, comprising:
   a light source, configured to emit a partially coherent beam;
   a spatial light modulator, configured to generate a partially coherent fractional vortex beam, that is, a to-be-measured fractional vortex beam;
   a displacement platform, configured to: move a scattering sample, and perform a horizontal and vertical movement overlap scan;
   a detector, placed in diffraction area, and configured to acquire diffraction light intensity;
   a non-transitory computer-readable medium that comprises a computer program, the computer program being executed by a processor to implement the steps of a method for measuring a topological charge of a partially coherent fractional vortex beam; and a rotating frosted glass sheet, wherein the method comprises:

irradiating the to-be-measured fractional vortex beam to a scattering sample, performing a horizontal and vertical movement overlap scan, and acquiring diffraction light intensity by using a detector placed in a diffraction area;

calculating a to-be-measured electric field and performing iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam;

reconstructing a cross-spectral density function of the to-be-measured fractional vortex beam according to the target to-be-measured electric field, and obtaining optical field information of the to-be-measured fractional vortex beam;

performing reverse transmission calculation according to the cross-spectral density function and the optical field information of the to-be-measured fractional vortex beam to obtain a source field vortex phase distribution diagram, and observing a magnitude and a sign of a topological charge of the to-be-measured fractional vortex beam according to the source field vortex phase distribution diagram;

emitting a beam to the rotating frosted glass sheet;

collimating the beam by a lens after diffusion by the rotating frosted glass sheet;

changing a degree of coherence of the beam by a size of a spot irradiated on the rotating frosted glass sheet;

passing the beam through the spatial light modulator to generate the partially coherent fractional vortex beam, wherein a degree of coherence of the generated partially coherent light field is large when the spot irradiated on the rotating frosted glass sheet is small and the beam on a rear surface of the spatial light modulator is a measurement object;

focusing the partially coherent fractional vortex beam and irradiating on a resolution board, after being transmitted by a distance;

placing the resolution board on a displacement platform, wherein a displacement distance is controlled by using a MATLAB software, the displacement platform is displaced by 10 steps in both an x direction and a y direction, with a step size of 20 μm, and a size of a spot on the resolution board is approximately 150 um;

acquiring a diffraction light intensity at 13 cm away from the resolution board by a camera;

obtaining main modes of the partially coherent fractional vortex beam after the acquired diffraction light intensity is introduced into a multi-mode stacked diffraction imaging;

retransmitting the beam to a plane of the spatial light modulator in the main modes; and obtaining the topological charge by examining phase discontinuity.

2. The apparatus for measuring a topological charge of a partially coherent fractional vortex beam according to claim 1, wherein the diffraction area is a Fresnel diffraction area or a Fraunhofer diffraction area.

3. The apparatus for measuring a topological charge of a partially coherent fractional vortex beam according to claim 1, wherein an overlap rate of the overlap scan ranges from 60% to 70%.

4. The apparatus for measuring a topological charge of a partially coherent fractional vortex beam according to claim 1, wherein before the calculating a to-be-measured electric field and performing iterative update by using a multimode stacked diffraction algorithm to minimize an error between the diffraction light intensity acquired by the detector and diffraction light intensity calculated according to the to-be-measured electric field, to obtain a target to-be-measured electric field of the to-be-measured fractional vortex beam, the method comprises:

decomposing a cross-spectral density $W(r_1, r_2)$ of the to-be-measured fractional vortex beam into a plurality of electric fields $$\sum_i^{N_R} O_{(r1)}^{*i} O_{(r2)}^{i} (i = 1, 2, 3, \ldots, \text{and } n)$$

by using a random modulus decomposition method, wherein $O_{(r1)}^{i}$ and $O_{(r2)}^{i}$ are $i^{th}$ electric fields after the to-be-measured fractional vortex beam is decomposed, $N_R$ is a positive integer selected according to a different degree of coherence, and $r_1$ and $r_2$ are spatial coordinates.

5. The apparatus for measuring a topological charge of a partially coherent fractional vortex beam according to claim 4, wherein the calculating a to-be-measured electric field and performing iterative update by using a multimode stacked diffraction algorithm to minimize an error between the diffraction light intensity acquired by the detector and diffraction light intensity currently calculated according to the to-be-measured electric field, to obtain a target to-be-measured electric field of the to-be-measured fractional vortex beam comprises:

step 1: assuming that the cross-spectral density of the to-be-measured fractional vortex beam irradiated to the scattering sample is $$W(r_1, r_2) = \sum_i^{N_R} O_{(r1)}^{*i} O_{(r2)}^{i},$$

and assuming that a transmittance function of a $j^{th}$ time of irradiation to the scattering sample is $P(r-R_j)$, wherein r represents a coordinate, $R_j$ represents a relative displacement between the to-be-measured fractional vortex beam and the scattering sample, and j represents the $j^{th}$ time of irradiation to a sample area;

step 2: calculating that each outgoing field after the to-be-measured fractional vortex beam passes through the scattering sample is $\varphi_j^i(r) = O_{(r)}^{i} * P(r-R_j)$;

step 3: updating a diffraction field by using the diffraction light intensity acquired by the detector, and updating the outgoing field to q' (r) according to the diffraction field;

step 4: updating each to-be-measured electric field $O_{(r)}^i$:

$$O_j'^i(r) = O_j^i(r) + \alpha \frac{P_j^*(r-R_j)}{|P_j^*(r-R_j)|_{max}^2}(\varphi_j'^i(r) - \varphi_j^i(r)), \text{ and}$$

$$P_j'(r-R_j) = P_j(r-R_j) + \beta \frac{O_j^{*i}(r)}{|o_j^{*i}(r)|_{max}^2}(\varphi_j'^i(r) - \varphi_j^i(r)),$$

wherein $\alpha$ and $\beta$ are constants, $\varphi_j'^i(r)$ represents an updated $i^{th}$ outgoing light electric field corresponding to a $j^{th}$ scan position, $\varphi_j^i(r)$ is an $i^{th}$ outgoing optical field corresponding to the $j^{th}$ scan position, $O_j'^i(r)$ is an updated $i^{th}$ incident light electric field irradiated to the scattering sample corresponding to the $j^{th}$ scan position, $O_j^i(r)$ is an $i^{th}$ incident light electric field irradiated to the scattering sample corresponding to the $j^{th}$ scan position, $P_j'(r-R_j)$ is an updated transmittance function of the $j^{th}$ time of irradiation to the scattering sample, and * represents taking conjugate; and step 5: determining, by using a gradient descent algorithm, whether the error between the diffraction light intensity acquired by the detector and the currently calculated diffraction light intensity reaches a preset minimization threshold, and if the error reaches the minimization threshold, obtaining the target to-be-measured electric field, or otherwise repeating steps 2 to 5 until the error reaches the minimization threshold.

6. The apparatus for measuring a topological charge of a partially coherent fractional vortex beam according to claim 5, wherein the reconstructing a cross-spectral density function of the to-be-measured fractional vortex beam according to the target to-be-measured electric field comprises:

making the cross-spectral density function $$W(r_1, r_2) = \sum_i^{N_R} \alpha_i O_{(r1)}^{*i} O_{(r2)}^i,$$

wherein $\alpha_i = 1/N_R$ is a spectral weight; and for a partially coherent beam, introducing a vortex phase, wherein the cross-spectral density may be represented as $W_0(r_1,r_2) = W(r_1,r_2)\exp(-il\theta_1)\exp(il\theta_2)$, wherein $\theta$ is an angular coordinate, l is the topological charge, when l is an integer, the cross-spectral density is represented as a partially coherent integer vortex beam, and when l is a fraction, the cross-spectral density is represented as a partially coherent fractional vortex beam.

7. The apparatus for measuring a topological charge of a partially coherent fractional vortex beam according to claim 6, wherein the obtaining optical field information of the to-be-measured fractional vortex beam comprises:

letting r1=r2, and calculating light intensity I; and letting r2=0, and calculating a degree of coherence μ.

8. The apparatus for measuring a topological charge of a partially coherent fractional vortex beam according to claim 1, wherein the performing reverse transmission calculation according to the optical field information of the to-be-measured fractional vortex beam to obtain a source field vortex phase distribution diagram, and observing a magnitude and a sign of a topological charge of the to-be-measured fractional vortex beam according to the source field vortex phase distribution diagram comprises:

performing W/|W| on the cross-spectral density function W to calculate a cross-spectral density phase distribution function:

obtaining the source field vortex phase distribution diagram according to the cross-spectral density phase distribution function; and observing a phase jump of a source plane or performing loop integration on a phase according to the source field vortex phase distribution diagram to obtain the topological charge of the fractional vortex beam.

\* \* \* \* \*